United States Patent
Kiryuschev et al.

(10) Patent No.: US 6,697,191 B2
(45) Date of Patent: Feb. 24, 2004

(54) ELECTRO-OPTICAL DISPLAY

(75) Inventors: Irina Kiryuschev, Ramat Gan (IL);
Semjon Konstein, Yaroslav (RU);
Rafael Topelberg, Ramat Gan (IL);
Zeev Kurlianchick, Tel Aviv (IL)

(73) Assignee: Visson IP, LLC, Dover, DE (US)

( * ) Notice: Subject to any disclaimer, the term of this patent is extended or adjusted under 35 U.S.C. 154(b) by 415 days.

(21) Appl. No.: 09/877,235

(22) Filed: Jun. 11, 2001

(65) Prior Publication Data

US 2002/0187697 A1 Dec. 12, 2002

(51) Int. Cl.[7] .............................................. H01S 3/00
(52) U.S. Cl. ................... 359/345; 313/483; 313/500; 313/505; 345/55; 345/76; 345/84; 428/293.1; 428/917
(58) Field of Search ............... 313/483, 500, 313/505, 511, 513; 345/55, 76, 84; 428/917, 293.1; 359/245

(56) References Cited

U.S. PATENT DOCUMENTS

| | | | | |
|---|---|---|---|---|
| 3,803,437 A | * | 4/1974 | Robinson | ............ 313/483 |
| RE33,740 E | * | 11/1991 | Taguchi et al. | ............ 345/177 |
| 5,876,863 A | * | 3/1999 | Feldman et al. | ............ 428/690 |
| 5,962,967 A | | 10/1999 | Kiryuschev et al. | ........ 313/491 |
| 6,031,511 A | * | 2/2000 | DeLuca et al. | ............ 345/84 |
| 6,072,619 A | | 6/2000 | Kiryuschev et al. | ........ 359/245 |
| 2002/0074937 A1 | * | 6/2002 | Guberman et al. | ........ 313/511 |

* cited by examiner

Primary Examiner—Evelyn Lester
(74) Attorney, Agent, or Firm—Browdy and Neimark, P.L.L.C.

(57) ABSTRACT

An electro-optic display material comprising a first and a second set of fibers, each fiber having a longitudinal conductive element the two sets forming a matrix structure of junctions, preferably woven. The structure further comprises an electro-optically active (EOA) substance at least partially coating the fibers of the first set; and a transparent or translucent conductive layer covering the EOA substance and having electric contact with the fibers of the second set at contact zones in the vicinity of the junctions. The conductivity of the conductive layer is limited to a predetermined value thereby defining, in the vicinity of each contact zone, an electro-optical activity zone (EOA zone) constituting a display element. Alternatively, the conductive layer is laid over the matrix structure in separated spots, each spot overlaying at least one junction and defining an EOA zone constituting a display element.

26 Claims, 5 Drawing Sheets

ELECTRO-OPTICAL DISPLAY

FIELD OF THE INVENTION

This invention relates to flexible electro-optic displays, in particular to matrix displays built from two sets of fibers.

BACKGROUND OF THE INVENTION

An electro-optic display is a device designed to change its optical behavior in response to an applied electric or magnetic field. Such a display usually comprises a plurality of display elements or pixels including an electro-optically active (EOA) substance, organized in a matrix or other pattern. Hereinafter, "EOA substance" is meant to denote any substance capable of changing its optic properties such as color, transparency, reflectivity, etc., or capable of emitting light, in response to changes of applied electric or electromagnetic field, and thereby suitable for displaying images. Flexible electro-optic displays may be made on flexible polymer films, where the EOA substance and patterns of electrodes are laid in thin layers over a polymer substrate, or may be built of a plurality of flexible filaments or strips, each having EOA layer, conductive layers, carrying layers, etc.

U.S. Pat. No. 5,962,967 and U.S. Pat. No. 6,072,619 disclose a display made of two sets of fibers arranged in a two-dimensional array. Each fiber includes a longitudinal conductor, and the fibers of at least one set are coated with light-emitting or other EOA substance. A display element (pixel) is formed at each junction where a fiber of one set transverses a fiber of the other set. The two-dimensional array may be formed by overlapping fibers of one set with the fibers of the other set, but preferably and advantageously the two sets of fibers are interlocked in a woven arrangement. Fibers may have round or flat cross-section. The manufacture process of fibers does not pose limitations to their length and, using known weaving techniques, flexible displays of large sizes may be produced. Woven displays do not need patterning (printing) of electrodes or of EOA substance, since the matrix structure with quite uniform pixel spacing is inherent in the nature of the textile fabric. Woven displays are also more flexible and robust than integral film displays.

However, the area of the display element, which is formed by the zone of electro-optical activity (EOA zone) at the junction of two fibers, is limited by the contact zone area of the two fibers or by the overlapping area of the conductive wires or layers in these fibers. Also, conductive wires normally used in such fibers are not transparent and they obscure the EOA zone. As a result, a relatively small quantity of the EOA substance, and a relatively small part of each fiber used in the woven display, may actually be engaged in producing an optical image on the display.

SUMMARY OF THE INVENTION

The present invention is concerned with an electro-optic display material comprising a first and a second set of fibers, each fiber having a longitudinal conductive element, the two sets forming a matrix structure of junctions, which structure further comprises an EOA substance at least partially coating the fibers of the first set, and a transparent or translucent conductive layer covering the EOA substance and having electric contact with the fibers of the second set at contact zones in the vicinity of said junctions. The fibers of the two sets are preferably interlocked in woven arrangement, and they can include conductive elements of any structure or have the form of flat strips or tapes. The introduction of the conductive layer over the EOA substance allows to obtain EOA zones and display elements of larger area than the area of a contact zone area between two fibers known in the prior art. The enlarged display elements may be obtained in different ways, according to different aspects of the present invention.

According to a first aspect of the invention, the conductivity of the transparent conductive layer is limited to a predetermined value thereby defining, in the vicinity of each contact zone, an EOA zone constituting a display element.

In one embodiment, the conductivity is selected so as to provide a display element at each junction while avoiding overlapping of adjacent display elements. In an alternative embodiment, the fibers of the two sets are arranged in groups, the space between adjacent groups being larger than the space between fibers within a group. The conductivity of the conductive layer is selected so as to allow the overlapping of adjacent display elements associated with fibers within a group but to prevent overlapping of display elements across adjacent groups, thereby forming a clustered display element over the intersection of a group of first set fibers with a group of second set fibers.

In accordance with a second aspect of the present invention, the transparent conductive layer is laid over the matrix structure in separated spots, each spot overlaying at least one junction and defining an EOA activity zone constituting a display element. Preferably, each spot overlays a plurality of contact zones between the conductive layer and the fibers of the second set thereby forming a clustered display element. The spots may have a rectangular shape to form another matrix over the initial matrix structure, or they may have any other shape and may form any desired pattern. The EOA substance also may be laid over the matrix structure in spots which are separated from each other and/or have different optical properties, thereby forming a visible image.

In accordance with a third aspect of the present invention, the transparent conductive layer is laid over the fibers of the first set in the form of separated sections, each section overlaying a plurality of junctions. The sections define EOA zones constituting clustered display elements.

The display material according to the above three aspects of the present invention may be produced from fibers coated with EOA substance, arranged in a matrix structure and then coated with a transparent conductive layer. Also, fibers may be first coated with EOA substance and a conductive layer thereabove, and then arranged in a matrix structure.

The display materials according to the first and second aspects of the present invention may also be produced from a matrix structure comprising a first and a second set of conductive wires, in which the wires of the first set have an insulating layer, by a method including a) covering the matrix structure with a layer of EOA substance so as to leave exposed parts of each wire of the second set; b) covering the matrix structure, over said layer of EOA substance, with at least one transparent or translucent conductive layer, so that the conductive layer is in electric contact with the exposed wires of the second set. This method allows to avoid creating of internal stresses and cracks in the EOA substance and the transparent conductive layer during weaving.

For the purposes of the present disclosure, it should be understood that if one entity is "covering" another entity, this does not exclude the presence of other entities between the first two. For example, when a layer of EOA substance coves a wire, this wire may have or may not have some protective or insulating layer on its surface. In a similar way, an "electric contact" between two objects should be understood as a proximity which allows such propagation of electric field or energy between these objects as necessary for functioning. For example, an alternating electric current may pass through a dielectric material or a gap between the two objects (capacitance electric contact).

The electro-optic display materials of the present invention have all the advantages of the woven flexible displays outlined in the background and additionally enable an extremely efficient controlled utilization of the EOA substance and length of the electro optic fibers invested in the display. In the case of EL display, for example, the material of the present invention allows to produce displays of unlimited size and resolution, enhanced brightness and low power consumption.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
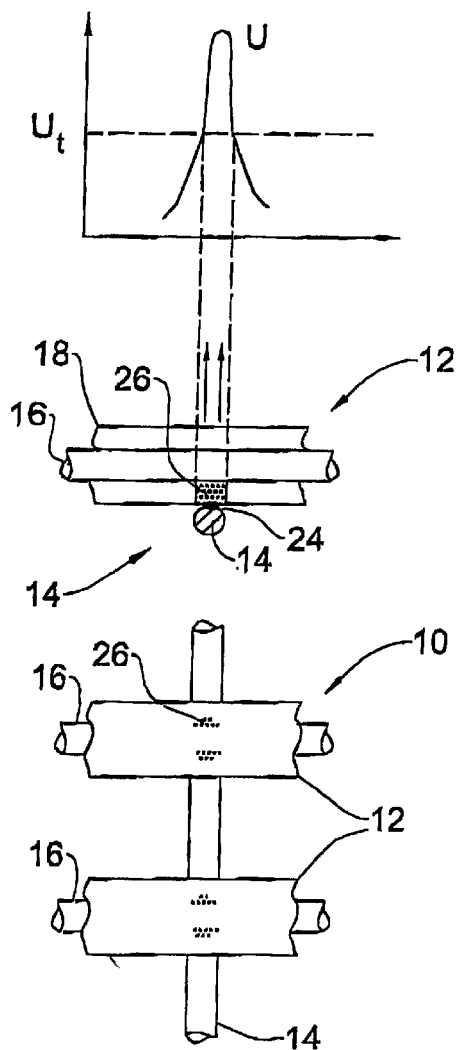
FIG. 1 is a schematic illustration of known display material.

With reference to FIG. 1, there is shown a schematic illustration of the structure and operation principle of a prior art electro-optic material of the kind to which the present invention refers. For the sake of explanation, without any limitation to the scope of the invention, an example of light-emitting electroluminescent (EL) display will be used, the inventive idea being applicable to display materials based on any kind of electro-optically active substance.

In a simplified and conventional way, FIG. 1 presents a sectional view and an associated plan view of a piece of electro-optic material 10 comprising two weft electro-optic fibers 12 and one warp fiber 14. It will be appreciated that denominations "weft" and "warp" are given here only for clarity, without reference to an actual textile structure.

The electro-optic fiber 12 comprises a conductive element (wire) 16 and an EL layer 18 therearound. It will be appreciated that a conductive wire may have any structure suitable for conducting electricity. For example, it may have round or flat section; be made of solid metal; be in the form of a dielectric fiber or strip covered or intertwined with a conductive fiber or layer, multiple-core twisted, spun, plaited wire; etc.

The warp fiber 14 may have the same structure as the weft fiber 12, or may comprise only a conductive wire without an EL layer, as shown. An EL pixel is formed in the contact zone 24 between the overlapping parts of the wires 16 and 14 and light is emitted from the small electro-optic activity zone (EOA zone) 26. As it can be seen in the plan view, the light-emitting zone 26 is partly-obscured by the non-transparent wire 16.

FIG. 1 also includes a graph showing the distribution of the operative electric voltage U between the electrodes 16 and 14 of the EOA zone along the length of the fiber 12. Light is emitted when and where this voltage exceeds a threshold value $U_t$. It will be appreciated that for a different EOA substance, a different characteristic of the electric field may be relevant, such as current, frequency, etc.

Figure 2:
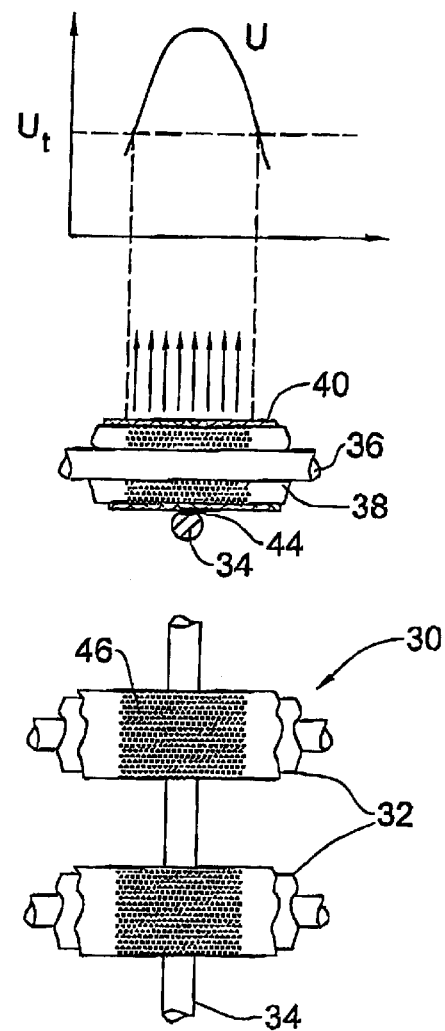
FIG. 2 is a schematic illustration of a display material with enlarged pixels according to a first aspect of the present invention.

With reference to FIG. 2, there is shown a schematic illustration of the structure and operation principle of an electro-optic material in accordance with one aspect of the present invention. FIG. 2 presents a sectional view and an associated plan view of a piece of electro-optic material 30 comprising two weft electro-optic fibers 32 and a warp fiber 34. The weft fiber 32 comprises a conductive wire 36 and an EL layer 38 therearound and has an additional conductive layer 40 in the form of a coaxial cylindrical electrode laid over the EL layer 38. The conductive layer 40 is transparent or translucent and has a predetermined conductivity. The warp fiber 34 is a wire in contact with the conductive layer 40 in the contact zone 44. It will be appreciated that in this case an EOA zone 46 is formed between the wire 36 and the conductive layer 40, which extends at both sides of the contact zone 44. The EOA zone 46 occupies a range of the fiber where the operative voltage U in the conductive layer 40 exceeds the threshold value $U_t$, as shown in the graph above the fibers. This range grows with the conductivity of the layer 40. Thus, an enlarged pixel is created where the whole volume of the EL substance associated with the pixel is involved in light emission. The conductivity of the conductive layer 40 is limited so as to terminate the light-emitting zone half-way to the contact zone of the next pixel and to avoid the mere of two adjacent pixels.

Figure 3:
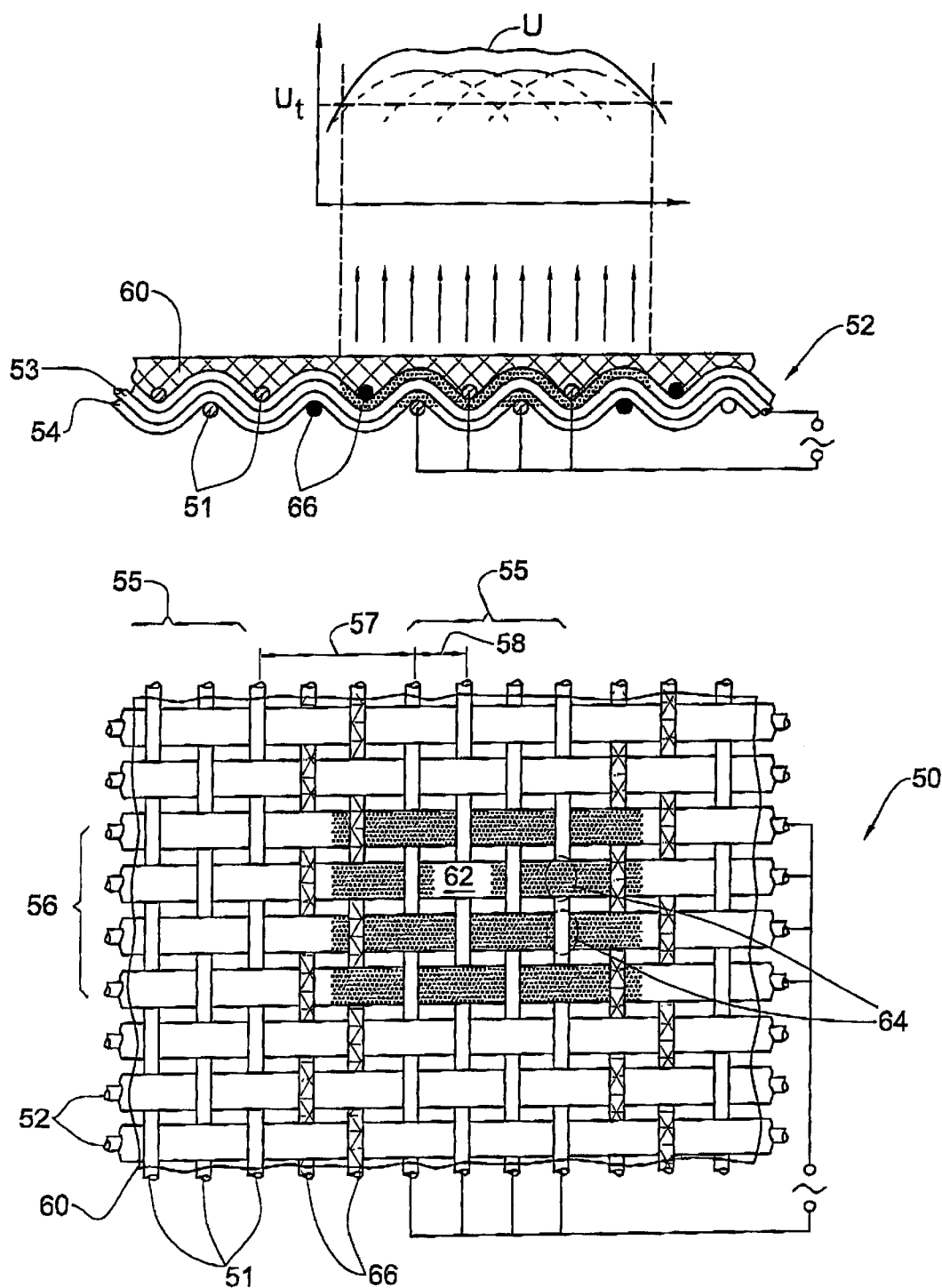
FIG. 3 is a schematic illustration of a display material with clustered pixels according to the first aspect of the present invention.

Another embodiment of the same aspect of the invention is a display material with clustered pixels shown in FIG. 3 in enlarged sectional and plan view. The woven display material 50 comprises a matrix of warp wires 51 and weft fibers 52 including a conductive wire 53 and an EOA layer 54. The warp wires 51 and weft fibers 52 are arranged in groups 55 and 56, the space 57 between adjacent warp groups being larger than the space 58 between wires or fibers within a group. An additional transparent conductive layer 60 is applied over the matrix. The conductivity of the additional layer 60 is limited to a value allowing overlapping of adjacent EOA zones associated with fibers within a group but preventing overlapping of EOA zones across adjacent groups. This is illustrated by the graph in FIG. 3 showing the distribution of the operative electric voltage U along the length of the fiber 52. The dotted lines in the graph show the operative voltage around individual warp wires 51 while the solid line is the total voltage. Light is emitted when and where this voltage exceeds a threshold value $U_t$. Thus, a clustered display element 62 is formed over the area of intersection of a group 55 of warp wires 51 with a group 56 of weft fibers 52. In the example shown in FIG. 3, the clustered display element 62 encompasses sixteen contact zones 64. The necessary spacing between groups may be achieved by adding non-conductive fibers 66 between the wires 51. It will be appreciated that the display material may be arranged from uniformly spaced and identical fibers in each respective direction but some of these fibers may be not connected to the electric circuitry in order to provide the necessary spacing between the groups of fibers.

Figure 5:
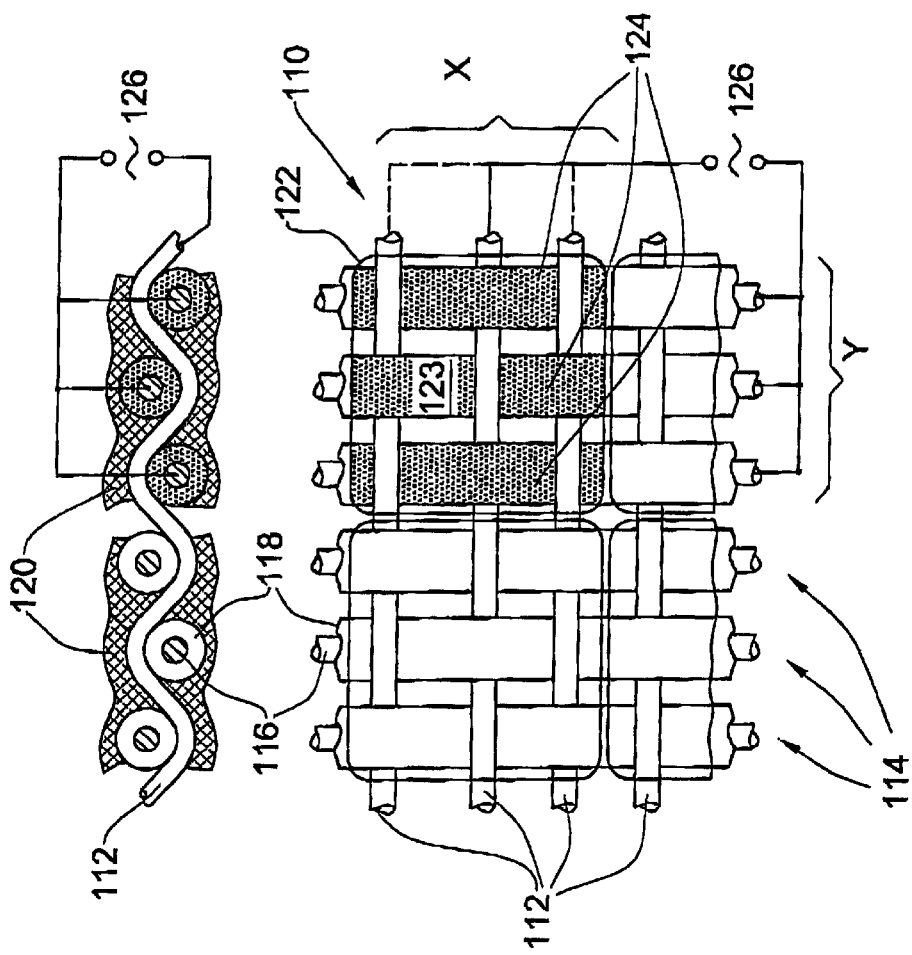
FIG. 5 is a schematic illustration of a clustered pixel in accordance with still another aspect of the present invention.
Figure 4:
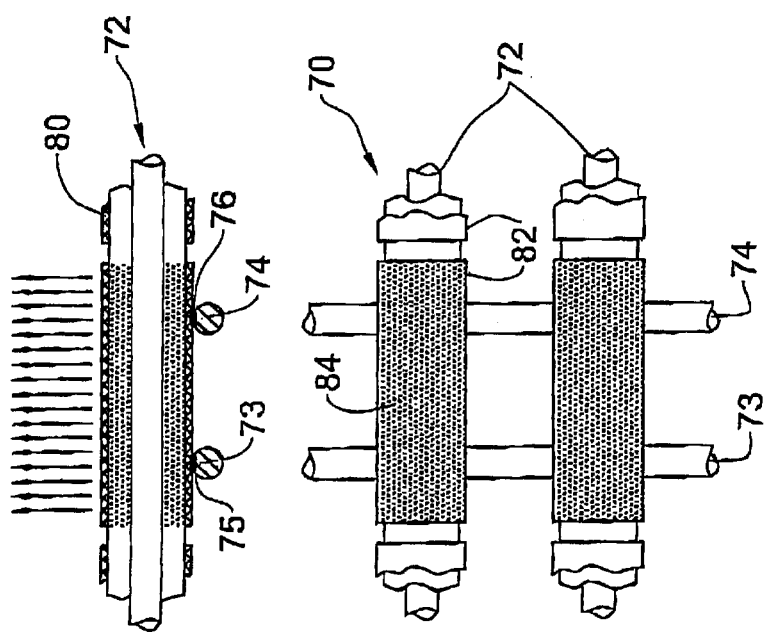
FIG. 4 is a schematic illustration of a display material according to another aspect of the present invention.

With reference to FIGS. 4 and 5, there is shown a schematic illustration of the structure and operation principle of two kinds of electro-optic material in accordance with another aspect of the present invention. In FIG. 4, a piece of electro-optic material 70 comprises two weft electro-optic fibers 72 and two warp wires 73 and 74 contacting in contact zones 75 and 76. The weft fibers 72 are similar to the fibers 32, in that they comprise a conductive wire 36, an EL layer 38 therearound, and an additional outer conductive layer 80. However, the conductive layer 80 is not of specially limited conductivity but is laid over the electro-optic fiber 72 in separated sections 82. As seen in FIG. 4, the light-emitting zones associated with contact zones 75 and 76 are merged in one EOA zone 84 extending as a continuous cylinder between the boundaries of one section 82. Thus, all EOA zones belonging to one section of the conductive layer 80 define one clustered pixel.

FIG. 5 shows an enlarged sectional and plan view of a display material 110 with clustered pixels. The display material 110 comprises warp wires 112 and weft fibers 114 made of conductive wires 116 and EL layer 118, arranged in a woven matrix structure. A transparent conductive layer 120 is applied on the matrix structure in square spots 122, each spot overlaying nine contact zones and defining one clustered pixel 123 with three EOA zones 124 instead of nine regular pixels. To produce light, the clustered pixel 123 is connected to a power source 126 by Y-lines powering the weft fibers 114, and by X-lines powering the wires 112. It will be appreciated to some of the X-lines in the clustered pixel may be omitted since all wires 112 powering the pixel 123 are connected in parallel through the conductive layer 120. It is also possible to apply the conductive layer in stripes which are continuous along the warp wires 112, since the division into clustered pixels in this direction is defined only by the wiring of the weft fibers 114.

From the viewpoint of the obtained EOA zones, it is not material whether the EOA substance is first laid on the wires which are then arranged into a matrix display structure, or the wires are first arranged into a matrix and then covered with EOA substance. Therefore, structures similar to the ones shown in FIGS. 2, 3 and 5, and operating on the same principles may be obtained by applying layers of EOA substance and of transparent conductive material over an arranged matrix of two sets of conductive wires. In any case it is important to isolate the conductive wires of the one set from the wires of the other set.

Figure 6:
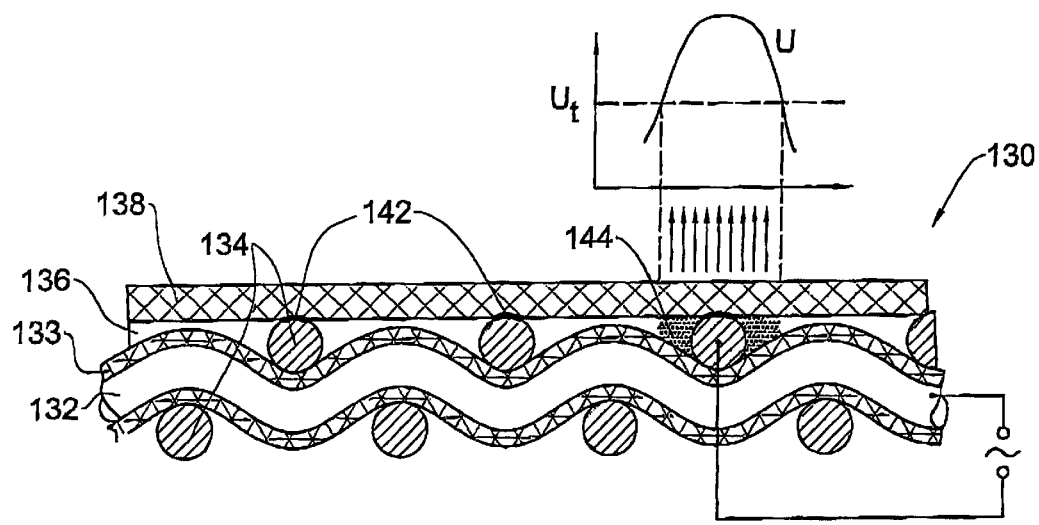
FIG. 6 is a schematic illustration of display material obtained by a method of the present invention and operating as shown in FIG. 2.

FIG. 6 shows in a cross-sectional view a matrix display material 130 comprising warp wires 132 and weft wires 134 spaced by a layer of insulation 133 covering the wires 132, and a layer of EOA substance 136. One or two transparent conductive layers 138 and 140 are applied on one or both sides of the matrix display material, in electric contact with the weft wires 134 in contact zones 142. An enlarged EL pixel is defined by an EOA zone 144 between the insulated warp wire 132 and one of the conductive layers 138 or 140 around each contact zone 142. The EOA zone 144 extends around the contact zone 142 within an area where the operative voltage U in the conductive layer 138 exceeds the threshold value $U_t$, as shown in the graph above the cross-section. Similarly to the materials shown in FIGS. 2 and 3, this area grows with the conductivity of the layer 138. The conductivity is limited so as to terminate the EOA zone 144 half-way to the contact zone of the next pixel and to avoid the visible merging of two adjacent pixels.

Alternatively, the wires 132 and 134 may be arranged in groups, the space between adjacent groups being larger than the space between the wires within a group, as explained with reference to FIG. 3. In this case, the conductivity of the conductive layer 138 may be limited to a value allowing the merging of adjacent EOA zones associated with the wires within a group but preventing merging of the EOA zones across adjacent groups. Thus, clustered pixels may be formed in a manner similar to the described with reference to FIG. 3.

Figure 7:
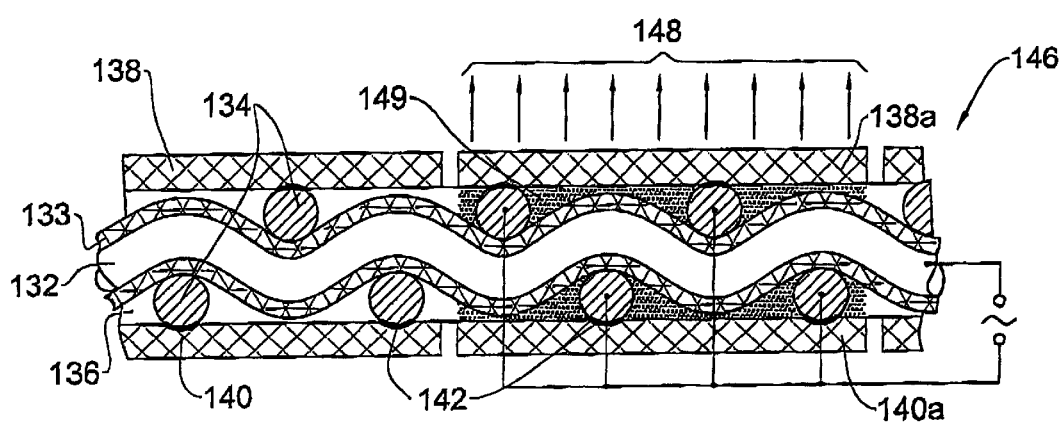
FIG. 7 is a schematic illusion of display material obtained by the method of the present invention and operating as shown in FIG. 5.

FIG. 7 is a cross-sectional view of a matrix display material 146 differing from the material 130 in FIG. 6 in that the conductive layers 138 and 140 are laid in separated spots 138*a* and 140*a*. A clustered pixel 148 is defined by the EOA zone 149 formed between the warp wires 132 and the conductive layers in the whole area covered by spots 138*a* and 140*a*.

When producing structures shown in FIGS. 6 and 7, the contact between the transparent conductive layer 138 or 140 and the warp wires 134 may be provided by exposing parts of warp wires in a number of ways. For example, the EOA layer 136 may be laid with thickness small enough as to leave each warp wire 134 at least partly exposed above or below the overlapping zones thereof with the weft wires 132. Also, the EOA layer may be laid to entirely cover wires 134 but then an outer sublayer thereof may be removed, so as to expose partly each wire 134. These methods of exposure are especially suitable for a woven matrix structure where warp wires 134 are protruding from the material at each junction with weft wires 132.

Figure 8:
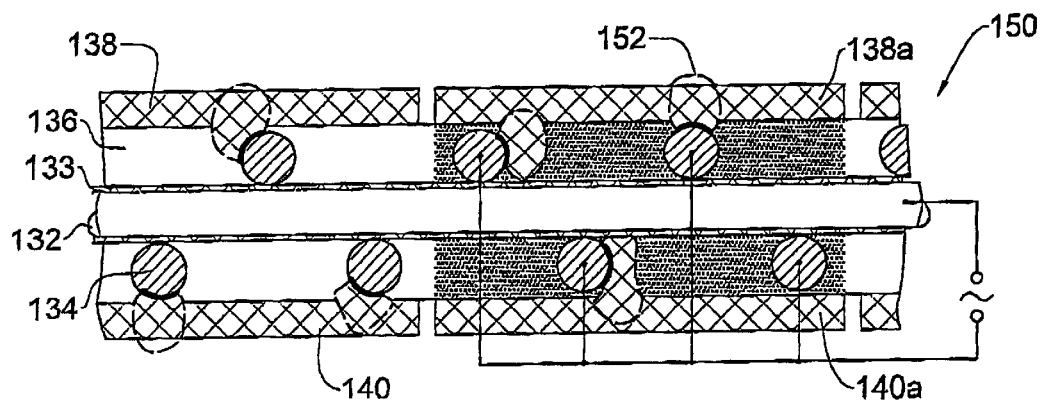
FIG. 8 is a schematic illustration of another display material obtained by the method of the present invention.

Another technique to expose parts of warp wires 134 is similar to the photolithography process and includes: sputtering the matrix structure with removable particles of suitable size ensuring that at least one such particle is attached to each warp wire 134; covering the matrix structure with a layer of EOA substance 136 so as to leave the removable particles at least parlay exposed; and removing the particles by dissolving, etching, washing or otherwise. The resulting display material structure 150 is shown in FIG. 8 where the positions 152 of the removable particles are denoted by broken lines. It will be appreciated that this technique is suitable both for woven and non-woven matrix structures. If the transparent conductive layer is applied in spots, then it is preferable to have at least one particle attached to each warp wire 134 in each spot. If a continuous layer of limited conductivity is used, as shown in FIG. 6, then it is necessary to ensure at least one particle for each overlapping zone of warp wire 134 with weft wire 132 in order to obtain the contact 142. The more contact zones 142 are obtained, the less may be the conductivity of the transparent layer 138 or 140. Thus, cheaper transparent conductive polymers may be used instead of indium-tin oxide (ITO).

Figure 9:
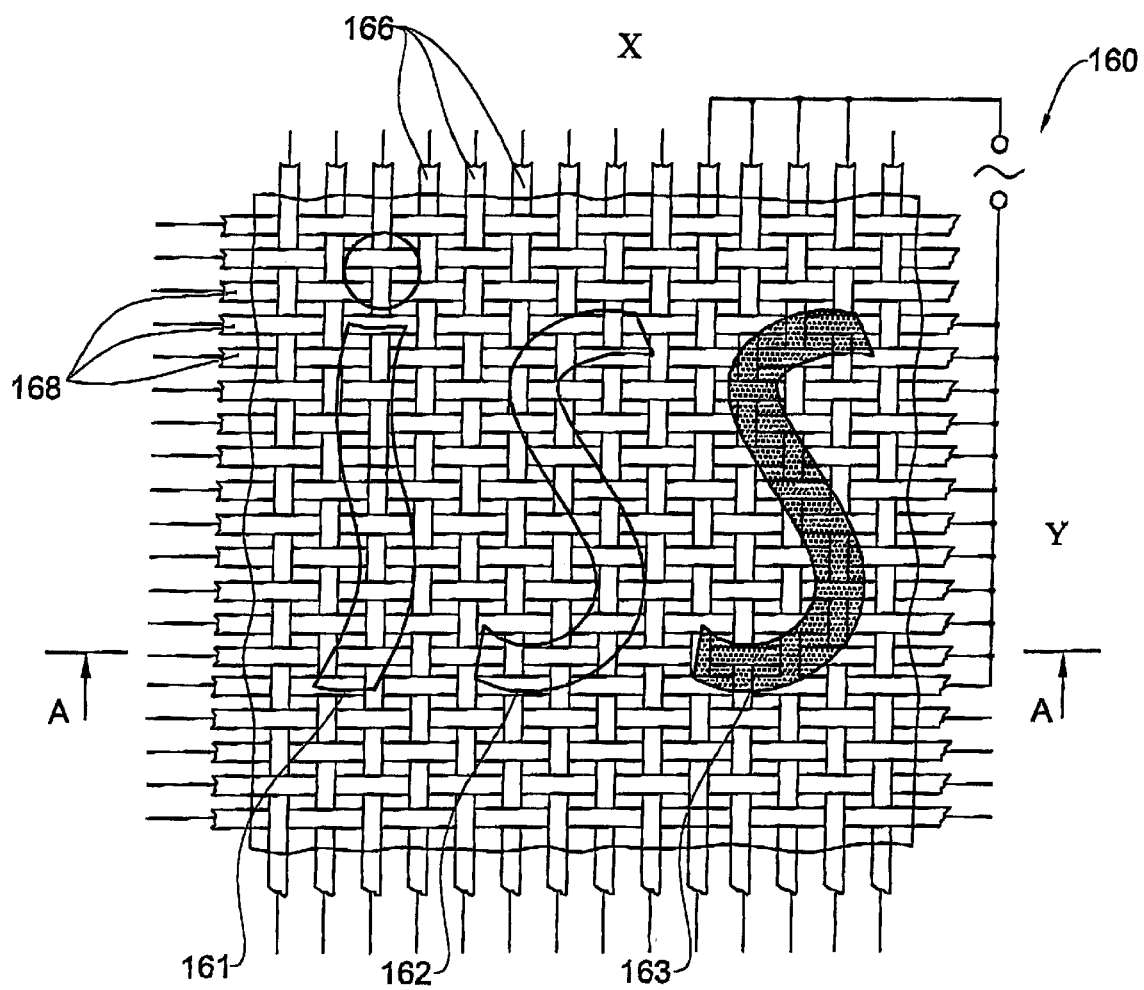
FIG. 9 is a schematic illusion of a display material according to the present invention with clustered pixels of arbitrary form.
Figure 9:
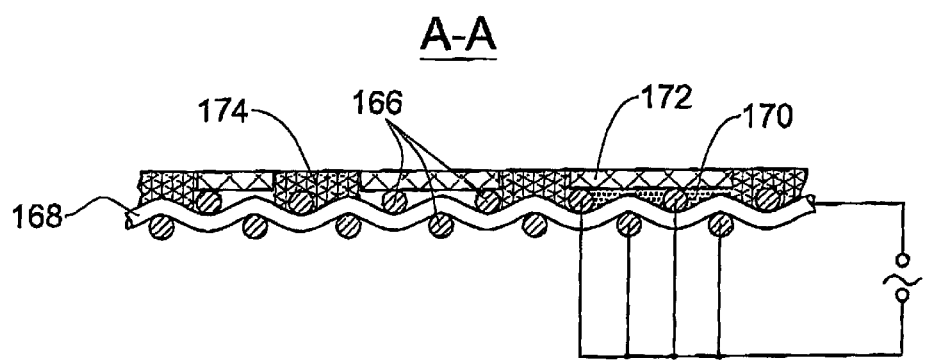

While the clustered pixels of the kind shown in FIG. 3 or 5 are parts of a matrix display where the display elements are arranged in rows and columns parallel to the warp and weft wires, clustered pixels of the kind shown in FIGS. 7 and 8 may have arbitrary shape in plan view. FIG. 9 shows an embodiment 160 of the material shown in FIG. 7, wherein clustered pixels of non-orthogonal form 161, 162, 163 are formed on a prepared orthogonal matrix of X-Y wires 166 and 168, respectively. The EOA substance 170 and the transparent conductive layer 172 are laid only within the contours of the pixels. The remaining surface of the matrix may be covered with insulating material 174. The pixel 163 is shown in light-emitting state.

It is also understood that a whole display may be made as a single clustered pixel, for example, if the spots 122 in FIG. 5 or the EOA substance 170 and the transparent conductive layer 172 in FIG. 9 are laid as one continuous layer. In this case, a static display will be obtained, e.g. a display that lights up as a whole. Nevertheless, a static display with the structure of FIG. 9 may carry an image consisting of elements with different color and brightness which are made of different EOA substance.

Although a description of specific embodiments bas been presented, it is contemplated that various changes could be made without deviating from the scope of the present invention as it is outlined in the claims. For example, both warp and weft fibers may be coated with an EOA substance before weaving, or the fibers may be in the form of flat strips or tapes. Also, the structures shown here on woven display material may be created on non-woven material and vice-versa.

What is claimed is:

1. An electro-optic display material comprising a first and a second set of fibers, each fiber having a longitudinal conductive element, said two sets forming a matrix structure of junctions, said structure further comprising:
   an electro-optically active (EOA) substance at least partially coating the fibers of the first set; and
   a transparent or translucent conductive layer covering the EOA substance and having electric contact with the fibers of the second set at contact zones in the vicinity of said junctions, wherein the conductivity of said conductive layer is limited to a predetermined value thereby defining, in the vicinity of each contact zone, an electro-optical activity zone (EOA zone) constituting a display element.

2. An electro-optic display material according to claim 1, wherein the conductivity of said conductive layer is limited to a value preventing overlapping of adjacent display elements.

3. An electro-optic display material according to claim 1, wherein the fibers of at least said second set are arranged in groups, the space between adjacent groups being larger than the space between fibers within a group, and the conductivity of said conductive layer is limited to a value allowing overlapping of adjacent display elements associated with fibers within a group but preventing overlapping of display elements across adjacent groups, thereby forming a clustered display element over each intersection of at least one fiber of the first set with a group of fibers of the second set.

4. An electro-optic display material according to claim 3, wherein at least one elongated spacing element is arranged between said adjacent groups of fibers, thereby providing for said larger space between groups.

5. An electro-optic display material according to claim 1, wherein said conductive layer is applied over said matrix structure.

6. An electro-optic display material according to claim 1, wherein said first and said second sets of fibers are interlocked in a woven arrangement.

7. An electro-optic display material according to claim 1, wherein at least some of said fibers are flat strips or tapes.

8. An electro-optic display material comprising a first and a second set of fibers, each fiber having a longitudinal conductive element, said two sets forming a matrix structure of junctions, said structure further comprising:
   an electro-optically active (EOA) substance at least partially coating the fibers of the first set; and
   a transparent or translucent conductive layer at least partially covering the EOA substance and having electric contact with the fibers of the second set,
wherein at least one of said EOA substance and said conductive layer is laid over said structure in the form of one or more spots.

9. An electro-optic display material according to claim 8, wherein said conductive layer covers said EOA substance in separated spots, each spot overlaying at least one junction and defining an electro-optical activity zone constituting a display element.

10. An electro-optic display material according to claim 9, wherein at least one of the conductive layer spots overlays a plurality of said junctions, thereby forming a clustered display element.

11. An electro-optic display material according to claim 8, wherein said first and said second sets of fibers are interlocked in a woven arrangement.

12. An electro-optic display material according to claim 8, wherein at least some of said fibers are flat strips or tapes.

13. An electro-optic display material according to claim 8, wherein said conductive layer is continuous, and said EOA substance is laid over said structure in a single spot.

14. An electro-optic display material according to claim 8, wherein said conductive layer is continuous, and said EOA substance is laid over said structure in separated spots, thereby forming a visible image defined by said separated spots.

15. An electro-optic display material according to claim 8, wherein said conductive layer is continuous, and said EOA substance is laid over said structure in spots having different electro-optic properties, thereby forming a visible image defined by said spots of EOA substance.

16. An electro-optic display material according to claim 8, wherein said EOA substance is laid over said structure in spots having different electro-optic properties, said conductive layer covers said EOA substance in separated spots, each conductive layer spot defining an electro-optical activity zone carrying a visible image formed by at least one of said spots of EOA substance.

17. An electro-optic display material comprising a fist and a second set of fibers, each fiber having a longitudinal conductive element, said two sets forming a matrix structure of junctions, said fibers further comprising:
   an electro-optically active (EOA) substance at least partially coating the fibers of the first set; and
   a transparent or translucent conductive layer laid over said fibers of the first set so as to at least partially cover the EOA substance thereon, and having electric contact with the fibers of the second set at said junctions, said conductive layer being in the form of separated sections, each section overlaying a plurality of junctions, thereby defining an electro-optical activity zone constituting a clustered display element.

18. An electro-optic display material according to claim 17, wherein said EOA substance is coating the fibers of the first sets in the form of separated sections.

19. An electro-optic display material according to claim 17, wherein said EOA substance is coating the fibers of the first sets in the form of sections with different electro-optic properties.

20. An electro-optic display material according to claim 17, wherein said first and said second sets of fibers are interlocked in a woven arrangement.

21. An electro-optic display material according to claim 17, wherein at least some of said fibers are flat strips or tapes.

22. An electro-optic display material according to claim 17, wherein the fibers of said second set further comprise a layer of EOA substance and an additional transparent or translucent conductive layer laid in separated sections thereover.

23. A method for production of electro-optic display material from a matrix structure comprising a first and a second set of conductive wires in which the wires of each set are transverse to, and overlapping the wires of the other set, the wires of the first set having an insulating layer thereon, said method including:
   a) covering said matrix structure with a layer of EOA substance so as to leave exposed parts of each wire of said second set;
   b) covering said matrix structure over said layer of EOA substance with at least one transparent or translucent conductive layer, so that said conductive layer is in electric contact with said exposed parts.

24. A method according to claim 23, wherein said matrix structure is a woven structure.

25. A method according to claim 23, wherein (b) is performed by laying said conductive layer in separated spots.

26. A method according to claim 23, wherein (a) is performed by laying said EOA layer in thickness small enough as to leave each wire of the second set at least partly exposed at the overlapping zones thereof with the wires of said first set.

* * * * *